United States Patent [19]
Levine

[11] Patent Number: 5,757,362
[45] Date of Patent: May 26, 1998

[54] RECURSIVE DIGITAL FILTER USING FIXED POINT ARITHMETIC

[75] Inventor: James Lewis Levine, Yorktown Heights, N.Y.

[73] Assignee: International Business Machines Corporation, Armonk, N.Y.

[21] Appl. No.: 487,528

[22] Filed: Jun. 7, 1995

Related U.S. Application Data

[63] Continuation-in-part of Ser. No. 369,011, Jan. 5, 1995.
[51] Int. Cl.⁶ .................................................. G09G 5/08
[52] U.S. Cl. .................. 345/166; 345/158; 364/724.17; 364/761; 382/265
[58] Field of Search .................................. 345/156, 157, 345/158, 166, 163; 348/734; 248/148 B; 463/37; 382/265, 260; 364/724.01, 724.03, 724.17, 736, 761, 723

[56] References Cited

U.S. PATENT DOCUMENTS

| 4,270,026 | 5/1981 | Sheroi et al. | 364/723 |
| 4,860,241 | 8/1989 | Haber | 364/761 |
| 5,179,254 | 1/1993 | McDermott | 382/261 |
| 5,504,896 | 4/1996 | Schell et al. | 395/650 |
| 5,528,264 | 6/1996 | Kautzer et al. | 345/158 |

*Primary Examiner*—Richard Hjerpe
*Assistant Examiner*—Lun-Yi Lao
*Attorney, Agent, or Firm*—Whitham, Curtis & Whitham McGinn; Stephen S. Strunck

[57] ABSTRACT

There is provided a digital processor that includes a recursive filter having means for using fixed point arithmetic for performing division. The recursive filter includes means for saving a remainder after each division and multiplication operation and for adding the remainder to a dividend in the subsequent division operation.

17 Claims, 7 Drawing Sheets

RECURSIVE DIGITAL FILTER USING FIXED POINT ARITHMETIC

CROSS-REFERENCE TO RELATED APPLICATIONS

This invention is a Continuation-In-Part of pending U.S. patent application Ser. No. 08/369,011 filed Jan. 5, 1995, upon which priority is claimed.

BACKGROUND OF THE INVENTION

1. Field of the Invention

The present invention generally relates to user-interactive media interfaces and, more particularly, to a recursive digital filter using fixed point arithmetic for a wireless pointing device for cursor control in interactive television and computer presentation graphics.

2. Description of the Related Art

A generally established method to provide human interaction with a system controlled by a computer is to provide the user with a graphical display of choices and a pointing device, such as a cursor controlled by a "mouse" (or other suitable relative positioning device). The pointing device is for manipulating the position of a cursor on the computer display or television (TV) screen to designate to the computer some desired action. The pointing device is usually provided with a computer-sensed button or switch, which can be actuated to cause the desired action to occur.

There is a need for a selection device with the functional capability of a mouse. Specifically, such a device would advantageously have the ability to (1) designate a displayed option for action by moving a cursor, and (2) initiate the action by pressing a button. For consumer applications, the device should be intuitive to use.

In the field of interactive television, the setting may be the home television room and the user may be any untrained member of the household. The user is commonly seated six feet or more from the television set, and thus out of reach of any controls built into or connected to the television. In the field of computer presentation graphics, the setting may be a lecture room, classroom, or unprepared demonstration area, and those present, who may have minimal training, may be standing or walking freely about the room.

The majority of pointing devices were developed for desktop use in conventional computing environments, and are poorly suited for the above applications. For example, a mouse, joystick or trackball is normally wired to the computer. The mouse requires a smooth, flat surface on which to roll, while the joystick or trackball must be fixed in a stable position for smooth operation. These devices also require some degree of fine muscle control and are difficult to use while standing or seated away from a desk. Furthermore, they are not intuitive devices, so that untrained users may find it difficult to grasp the relationship between the cursor position and the hand or finger motions required to move it.

An alternative device which eliminates the wire is a joystick or trackball built into a hand held device. The motion of the ball or stick may be sent to the computer via an infrared (IR) or radio frequency (RF) communication link. Such devices suffer from the other problems mentioned above and may require two handed operation, a further disadvantage.

Yet another alternative is a wireless hand held device equipped with an array of push buttons or a multi-element rocker switch. These do not require a stable surface, but they do require the user to remove his eyes from the screen to locate buttons. They are even less intuitive than the other devices, as the user is required to grasp the relationship between an arbitrary button and text or images displayed on the screen.

With the above context in mind regarding wireless pointing devices, digital filters have been used previously. However, prior to the invention, "hangups" occurred in which the filter output did not always follow changes in filter input, but instead became "stuck" at incorrect values. The "hangup" problem normally occurs in the digital filter that is locating the cursor on the screen in response to the user's input.

The calculation of the "X" and "Y" coordinates for locating the cursor on the screen requires a division step which may result in a number and a remainder. If the digital filter does not have floating point arithmetic capability, the remainder is dropped and the successive division calculations may eventually become "stuck" on a specific value. Therefore, while the user may continue to input movement, the cursor will stick at one coordinate position and be rendered unusable.

In the conventional systems, the "hangup" problem was normally solved by using a digital filter that had floating point capability. However, there are many disadvantages associated with providing floating point capability.

For example, digital filters employing floating point arithmetic are more expensive. If the filter uses floating point arithmetic, the filter will have to be part of the device driver running on the P.C. Therefore, the code will have to be re-written for each new operating system. This is especially the case for computers based on a chip using non-standard architecture.

In contrast, if the filter uses fixed point arithmetic, then the filter can use an inexpensive 8-bit processor. Using an 8-bit processor simplifies writing a device driver for a new operating system or computer. Using an 8-bit processor also protects the performance of the pointer by locking up the filter algorithm. Putting the code in the processor rather than in the device driver eliminates the need to re-write the filter for each new device driver, and thus eliminates a significant source of errors.

Processors without floating point capability can emulate floating point digital filters. However, the operations are emulated with slow-running software which degrade overall system efficiency and speed.

A simple illustration of the problem is the recursive low-pass filter. Let the input values be $X_n$, where n=1, 2, 3, . . . , and let the output values be $Y_n$, as in equation 1:

$$Y_n = Y_{n-1} + (X_n - Y_{n-1})/Q$$

In other words, after each step n, the output value Y changes by a fraction of the difference between the current value and the latest X value. The value Q is the time constant of the filter. The "hangup" problem is caused by the fixed-point division. After such a division, the processor truncates the result downwards to the nearest integer and the remainder is not used.

Thus, dividend 7 divided by divisor 5 and 6 divided by 5 are both set to 1, while 4 divided by 5 is set to 0. The effect of equation 1 on the filter is shown by constructing a spread sheet, which is shown below in Table 1 for the case where Q=5.

Assume that X and Y are initially 0, and that at n=1, X makes a step change to the value 7. Y should rise smoothly, converging to the value 7. Instead, Y sticks at the value 3 after a few steps.

TABLE 1

| I<br>n | II<br>$X_n$ | III<br>$Y_{n-1}$ | IV<br>$X_n - Y_{n-1}$ | V<br>$(X_n - Y_{n-1})/5$ | VI<br>$Y_n$ |
|---|---|---|---|---|---|
| 0 | 0 | 0 | 0 | 0 | 0 |
| 1 | 7 | 0 | 7 | 1 | 1 |
| 2 | 7 | 1 | 6 | 1 | 2 |
| 3 | 7 | 2 | 5 | 1 | 3 |
| 4 | 7 | 3 | 4 | 0 | 3 |
| 5 | 7 | 3 | 4 | 0 | 3 |
| 6 | 7 | 3 | 4 | 0 | 3 |
| 7 | 7 | 3 | 4 | 0 | 3 |

From the above Table 1, it is evident that, at n=4, the "growth" term of column V is truncated to 0 after each division, thereby preventing further increases.

However, had the division been done using floating point arithmetic, then a similar table would show the output approaching the input value as expected. However, as mentioned above, providing such a floating point arithmetic capability is expensive in terms of hardware and labor intensive with regard to the software required for each new operating system since the filter is a portion of the device driver running on the PC.

SUMMARY OF THE INVENTION

It is therefore an object of the present invention to provide a digital filter which avoids "hangups," in which the filter output does not reliably and continuously follow changes in filter input, and a filter which is prevented from sticking at incorrect values.

Another object is to provide a digital filter which is implemented on a low-cost processor which lacks floating point capability.

Yet another object is to provide a digital filter for use with a wireless device to manually position a cursor on a display device by an intuitive direct pointing action.

In a first aspect of the present invention, a digital processor is provided which includes a recursive filter including means for using fixed point arithmetic for performing multiplication and division. The recursive filter also includes means for saving a remainder after each division operation and for adding the remainder to a dividend in a subsequent division operation.

In a second aspect according to the present invention, the digital processor is provided for use with a remote pointing system for controlling a cursor location on a display device.

In a third aspect according to the present invention, a remote pointing system for controlling a cursor location on a display device which includes a pointing device for remotely controlling the cursor on the display device. The pointing device includes at least three infrared light emitting diodes (IRLEDs), each of the IRLEDs being aimed off a main or pointing axis of the pointing device in different directions. A circuit is connected to each of the IRLEDs responsive to a user input for sequentially pulsing the IRLEDs with pulse trains so as to cause the IRLEDs to individually and sequentially emit modulated infrared light signals. A receiver and controller is located proximate to the display device, and includes an infrared detector and amplifier tuned to a predetermined pulse frequency. A demodulator converts received signals to analog base-band pulses and an analog-to-digital converter digitizes the analog base-band pulses. A digital processor processes the digitized analog base-band pulses as data representing a point of aim on the display device by the pointing device, and control the position of a cursor on the display device. A cursor controller, responsive to the digital processor, controls a cursor position on a display device.

The digital processor includes a recursive filter using fixed point arithmetic for performing division. The recursive filter saves a remainder after each division operation and adds the remainder to a dividend in a subsequent division operation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
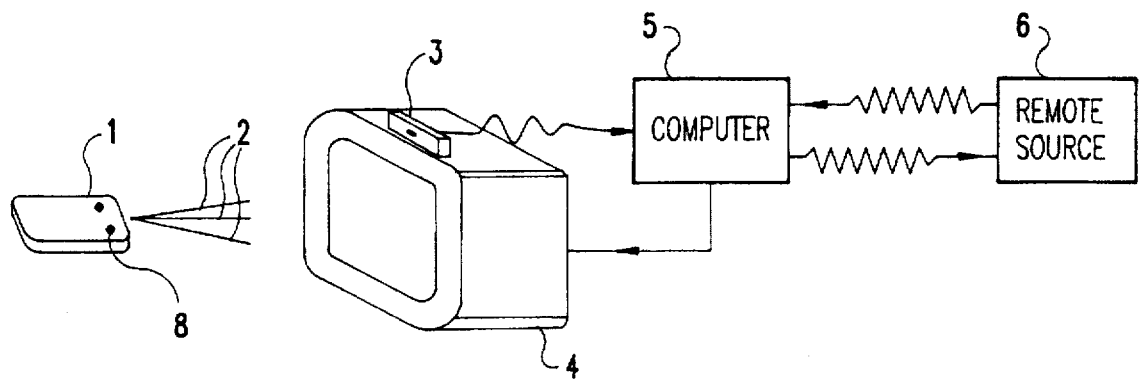
FIG. 1 is a high level block diagram illustrating the basic components in practice of the invention.

Referring now to the drawings, and more particularly to FIG. 1, the preferred context of the invention will be described. However, it is noted that the digital filter of the present invention has a plurality of different applications in numerous technological areas. Thus, as would be easily and clearly recognized by one of ordinary skill in the art within the purview of the present application, the utilization of the digital filter, according to the present invention, with a pointing device is merely exemplary and not restrictive.

Turning now to FIG. 1, there is shown a hand-held controller 1, which emits infrared beams 2, and an optical receiving device 3, which receives the infrared beams 2. A display device 4 is connected to a computer 5 which also receives an input from the receiving device 3. The computer 5 may optionally be connected in a bidirectional manner to a remote source 6, which provides data and/or images as part of an interactive system.

There are two modes of operation. In a pointing mode, the transmitter IRLEDs are pulsed in sequence, each pulse consisting of a burst of short pulses at a frequency in the 30-50 kHz range. Conventional TV remote controllers normally apply such pulses to a single IRLED. Hence, only minor changes are required to sequentially drive three or more IRLEDs. The amplitude of each pulse is detected by the receiver, which includes a photo-detector, tuned amplifier, and demodulator. The three or more pulse amplitudes are used to calculate an aiming direction.

When the button is actuated (e.g., depressed), an additional pulse is output. Detection of this extra pulse is taken as the "action" signal. If desired, a second button can be used to send out yet another pulse, thus allowing the device to substitute for a standard two-button mouse.

In an optional code mode, control codes are transmitted via one or more of the LEDs. Such codes often include a start pulse, a stop pulse, and from one to eight intermediate pulses to transmit a one-byte code. Here, the device first will output one more pulse than the maximum number used in pointing mode, the group then acting as a start pulse. It will then send a code in the usual way. This mode would be provided in order to eliminate the need for a separate TV controller.

Figure 2A:
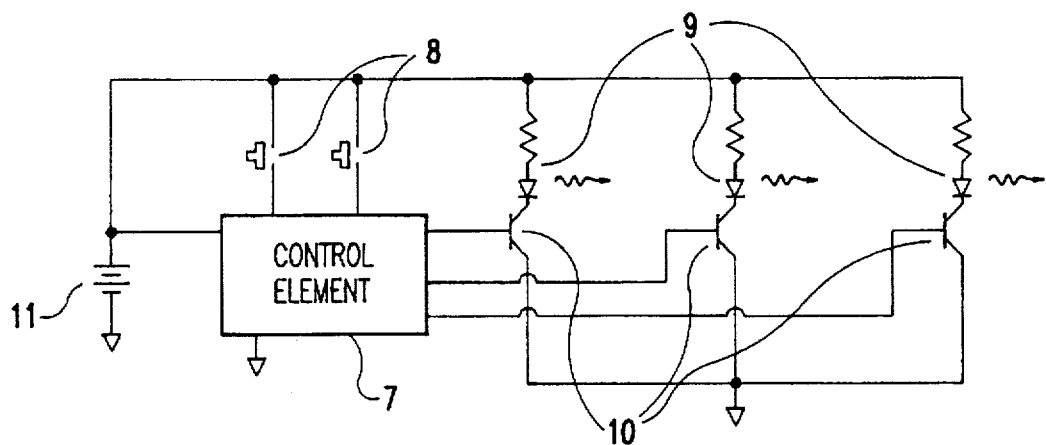
FIG. 2A is a block and schematic diagram showing the transmitter electronics.
Figure 2B:
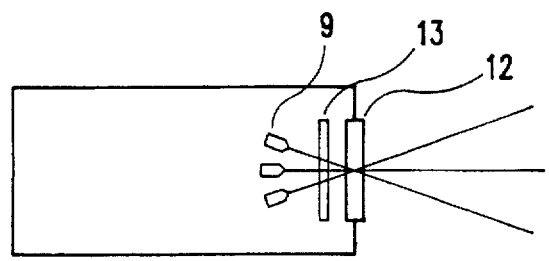
FIG. 2B is a schematic diagram of the transmitter showing the diverging IR beams.

The hand held device, or transmitter, is shown in more detail in FIGS. 2A and 2B. FIG. 2A shows the electronic circuit diagram. Logic control element 7 monitors the state of push buttons 8 and drives IRLEDs 9 through transistors 10. Control element 7 is preferably a permanently programmed micro-controller, which is both flexible and economical. A variety of commercially-available micro-controllers may be used, for example those being currently manufactured for use in hand-held TV and VCR remote control devices. It will be apparent to one versed in the art that the function of the control element 7 can be implemented with discrete logic elements as well. Further, while only two push buttons 8 are shown, there may be only one for a dedicated pointing device or there may be a plurality where the pointing device is incorporated into a TV or VCR controller.

Electrical power is supplied by battery 11, which may be rechargeable. In order to limit battery drain, the pointing pulses would be started by pressing the push-button, and continue for some predetermined time. This time would be extended each time the button was pressed. The IRLEDs 9 may be LD242 diodes manufactured by Siemens, Inc. These components are mounted within a housing shaped to fit the hand, with at least one button located at the natural resting position of the thumb or index finger, as in the case of a mouse or trackball.

Referring to FIG. 2B, the IRLEDs are located behind window 12, which may be formed of any plastic transparent to infrared radiation. For aesthetic purposes, the plastic may be opaque to visible radiation. Proper operation requires that the radiation from each IRLED decrease smoothly with angle. Various artifacts resulting from the LED manufacturing processes may distort the radiation pattern. These effects are reduced by the addition of an optical diffusing filter 13.

FIG. 2B also shows how the IRLEDs are arranged to provide three diverging but overlapping beams. While FIG. 2B is a two-dimensional representation of the diverging beams, it will be understood that the divergence of the beams is actually in three dimensions with beams projecting into and out of the plane of FIG. 2B. The beams first converge onto window 11, so that any dirt or scratches will have approximately equal effects on each beam, and then the beams diverge.

The operation of the transmitter is described below with reference to FIGS. 2A and 3.

Initially, control element 7 is in a passive state referred to as "sleep mode" to conserve battery power. When any button is pressed, the control element "wakes up" and begins a transmission. This sleep mode is a common function of a micro-controller intended for low power operation. After a lack of button activity for a predetermined time as set by the program (e.g., 30 seconds), the processor will return to the sleep mode.

Figure 3:
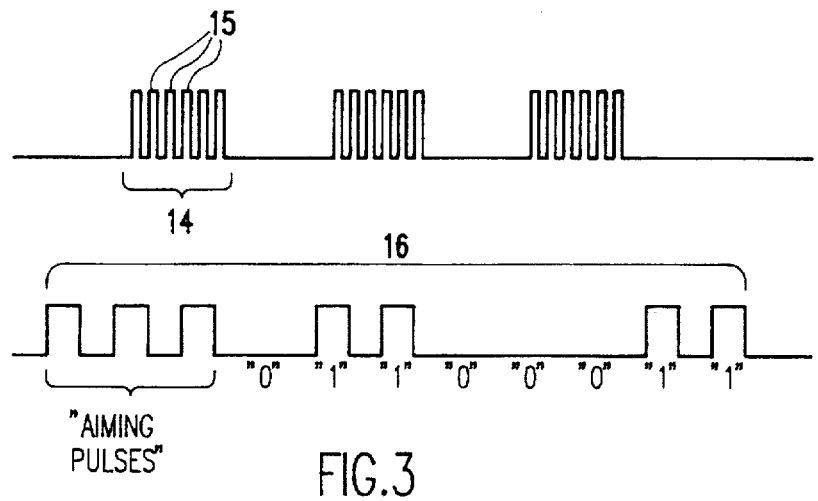
FIG. 3 is a timing diagram showing transmitted pulse sequences.

Referring to FIG. 3, transmission includes several pulse groups 14, which may be applied to one or more IRLEDs. Each group includes a fixed number of individual pulses 15 at the center frequency of the detection filter. The pulses are applied to the IRLEDs through transistors 10 connected to output pins of element 7. These are switched on-and-off under control of a program stored in element 7. The program execution speed is fixed by a quartz crystal (not shown) connected to element 7. Hence, frequency, group length, and inter-group spacing are all accurately controlled.

In accordance with the general discussion above, a first group of pulses is applied to one IRLED, a second group to another, and a third group to the last. When received, these pulses will be used to position the cursor. When a button is pressed, one or more additional pulse groups are applied to one or more IRLEDS simultaneously. Sequence 16 illustrates a code transmission consisting of the binary bit pattern 01100011, following three initial pulses. It will be understood that there are many alternative ways of encoding without departing from the spirit of this invention. In particular, the coded information can precede the pulses used to position the cursor. In this case, a special code may be used to indicate that position pulses will be sent.

In accordance with the method used to determine the pointing direction, yet to be discussed, the three IRLEDs should have approximately equal output power. Although it would be possible to hand-select sets of IRLEDs, a more economical procedure is to have control element 7 adjust the effective power by control of the individual pulse widths. This requires a one-time measurement of intensities using, for example, the receiver described below. The correct pulse widths can then be calculated and stored in a nonvolatile memory in or connected to element 7.

As with a conventional TV or VCR controller, the receiver uses a narrow band tuned amplifier to minimize interference from stray light. Thus, the infrared pulses are modulated at a matching carrier frequency. Additionally, the receiver photo detector includes an optical filter with a moderately narrow pass band centered on the IRLED emission.

Figure 4:
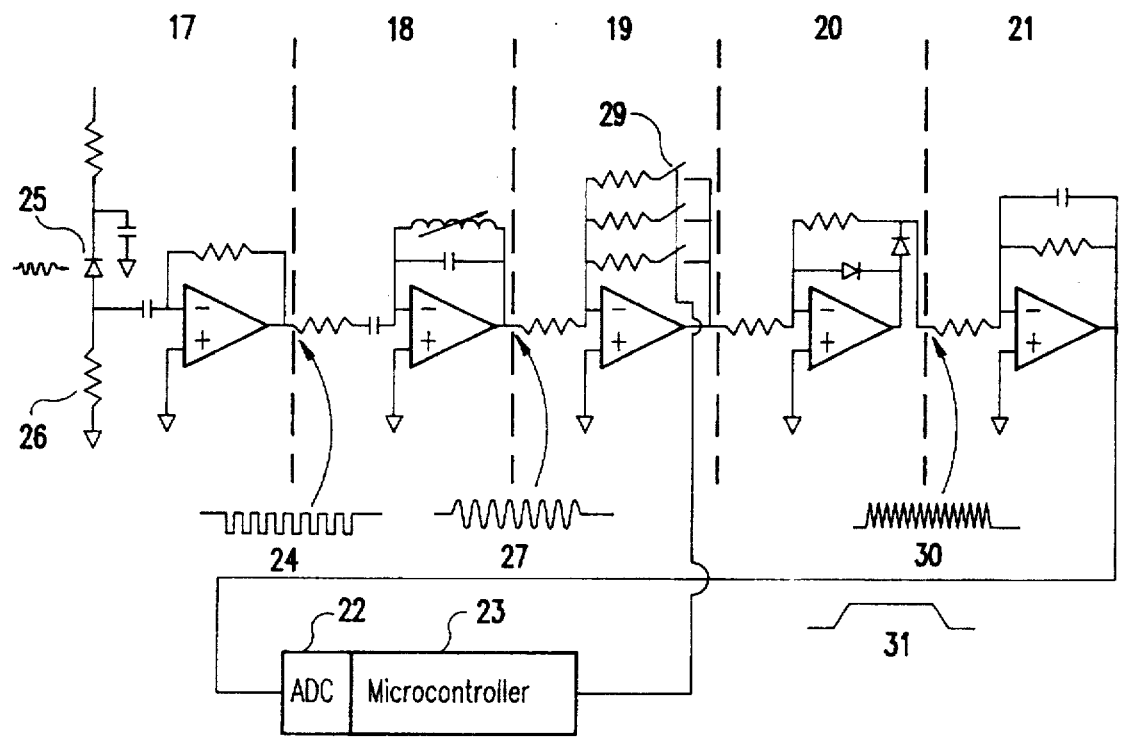
FIG. 4 is a block and schematic diagram showing the receiver electronics.

FIG. 4 is schematic diagram of the receiver which includes six functional sections separated by dashed boxes. These sections are, in the stated order, a photodetector and transimpedance amplifier 17, a tuned amplifier 18, a digital gain control 19, a diode demodulator 20, a smoothing filter 21, an analog-to-digital converter (ADC) 22, and a computing element 23. Sections 17 to 21 are based on standard operational amplifiers, using circuits well-known to those versed in the art. Many alternative circuit arrangements can be used to perform both the general and specific functions. Computing element 23 is a conventional microprocessor with a control program stored in a read only memory (ROM), such as an electronically programmable read only memory (EPROM).

As illustrated here, the ADC 22 is actually a part of computing element 23, but an external ADC is equally satisfactory. Similarly, computing element 23 could be a complete computer system, as generally indicated in FIG. 1. The ADC provides the means for the stored program to monitor the incoming optical pulses.

The general operation of the analog section 17 to 21 is described as follows. Arriving infrared pulses are converted to voltage pulses 24 by photodetector 25 and transimpedance amplifier 17 and then input to tuned amplifier 18.

Resistor 26 in series with the photo detector 25 serves as a drain for low frequency photo currents caused by ambient light. In the tuned amplifier 18, tuning is provided by the inductor-capacitor feedback combination to provide a center frequency of about 30 kHz and full bandwidth of about 600 Hz. Thus, only signals modulated at a frequency close to 30 kHz are amplified and extraneous signals are rejected. The output of section 18, in response to the input pulses 24, is a modulated burst 27 having zero average voltage. The signals are further amplified in section 19 with an amplification factor determined by the setting of electronic switches 29. The amplified pulses are rectified in section 20 to produce base band pulses 30. These are filtered in section 21, producing smoothed pulses 31, which are input to ADC 22.

The pulses are measured by computing element 23, using repetitive ADC samples of the signal voltage. These samples are repeated at a steady rate sufficient to follow the pulse waveforms. A pulse is considered valid if it remains above a small threshold value for a number of samples corresponding to the known pulse width, and then falls below threshold. After the leading edge is found, a fixed number of sample voltages are summed to produce an average pulse height. An equal number of samples are taken and subtracted during the inter-pulse period to remove any background signal caused by rectified noise and/or amplifier offset.

Successive pulses are similarly detected, each considered valid if it begins and ends at the expected times. If more than three pulses are found, the extra pulses are interpreted as a code and their amplitudes ignored. The entire pulse sequence is rejected as invalid if an unexpected transition occurs.

After each pulse sequence, the computing element 23 adjusts the gain of section 19, by closing one or more of the switches 29 in the feedback path, in accordance with the maximum amplitude of the first three pulses. The object is to obtain maximum dynamic range from the ADC 22, which can be achieved if the largest pulse amplitude is just below the full-scale range of the ADC. Such adjustment is essential because the optical signals decrease with the square of the distance from the receiver. In the absence of signals, the computing element 23 increases the gain in steps, by opening the switches 29 in section 19, until either a signal is found or maximum gain is achieved.

A cursor position may be calculated from the measured pulses, such that the cursor would be positioned at the point on the screen at which the device is aimed. This is not actually desirable, as precise cursor placement would require very fine motor control if the distance to the screen is greater than a few feet. A preferred method is to translate a fixed range of rotational angles into full screen motions of the cursor, independent of distance. The cursor itself will provide visual feedback, and one can rely on human eye-hand coordination to make a final adjustment. The method is described below.

The rotation direction is calculated for the measured signals according to the following slightly idealized model. The emission from an IRLED decreases with angle and distance according to approximate formula:

$$S = \left(\frac{K}{R^2}\right)\left(1 - \left(\frac{A}{Ac}\right)^2\right) \text{watts/cm}^2, \quad (1)$$

where, Ac represents a cutoff angle, beyond which the radiation is negligible. Consider first, two identical IRLEDs offset left and right by angle Ao. If the pair of IRLEDs are then rotated in their own plane, the signals will vary as $$S_r = \left(\frac{K}{R^2}\right)\left(1 - \left(\frac{(A-Ao)}{Ac}\right)^2\right), \text{ and} \quad (2a)$$

$$S_l = \left(\frac{K}{R^2}\right)\left(1 - \left(\frac{(A+Ao)}{Ac}\right)^2\right). \quad (2b)$$

A useful measure of the left-right rotational angle Ax is $$Ax = \frac{S_l - S_r}{S_l + S_r}, \text{ and} \quad (3a)$$

$$Ax = \frac{\left(\frac{(A+Ao)}{Ac}\right)^2 - \left(\frac{(A-Ao)}{AC}\right)^2}{\left(\frac{(A+Ao)}{Ac}\right)^2 + \left(\frac{(a-Ao)}{Ac}\right)^2}. \quad (3b)$$

Figure 5:
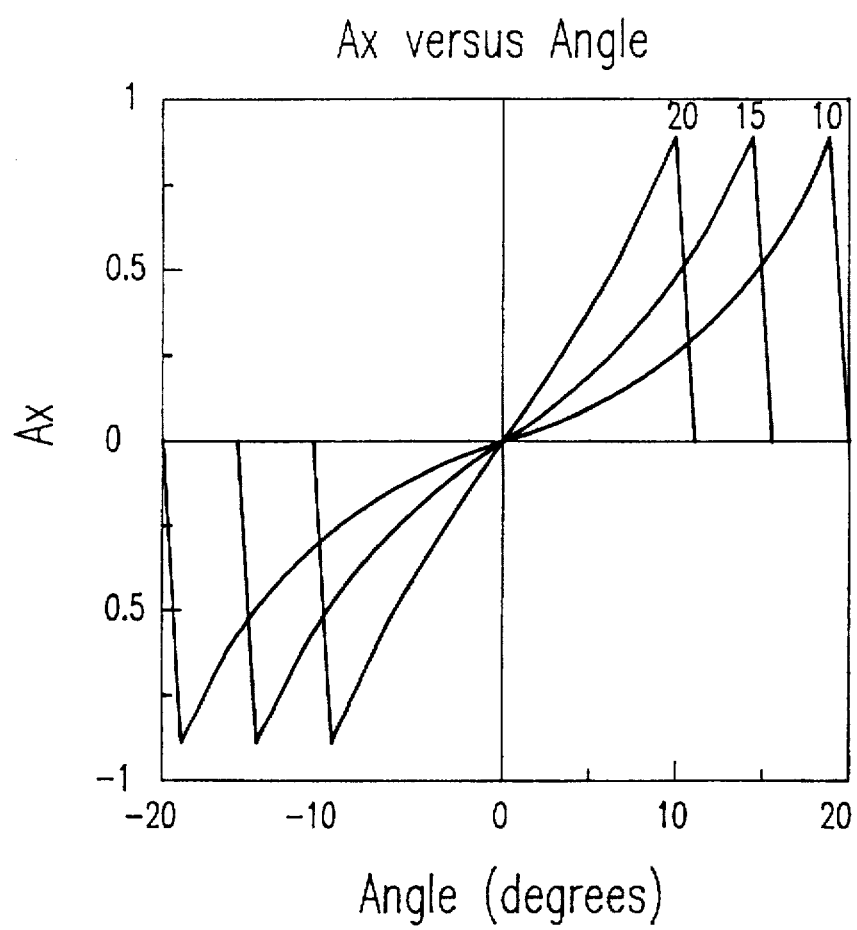
FIG. 5 is a graph of the transfer function showing the dependence of the rotation angle Ax on cutoff angle.

This measure is independent of the distance, as desired, as well as the actual power output of the IRLEDs. The dependence of Ax on angle is shown in FIG. 5 for a cutoff angle of 30°, for several values of the offset angle Ao. For this example, an offset angle of about 20° produces a smooth variation of cursor position with angle over a comfortable range of rotation angles.

The vertical position is obtained from the third IRLED, which may have a vertical offset angle equal to Ao. Denoting the vertical signal by Sv, the vertical rotation angle Ay is calculated as $$Ay = Sv/(Sv + 0.5(Sl + Sr)).$$

The cursor coordinates Xc and Yc are proportional to Ax and Ay, respectively.

Because of the visual feedback provided by the cursor, normal hand-eye coordination can provide excellent selection accuracy with minimal training. However, it is necessary to filter out the effect of hand tremor to avoid visible cursor jitter, while still allowing rapid cursor movements. These two goals are in conflict and cannot be realized with a conventional linear filter. A linear filter has an inherent delay between input and output, and this delay increases as the degree of filtering is increased. Instead, a nonlinear filter is required in which the degree of filtering is decreased as the cursor velocity increases. The principle is that jitter will be less noticeable when the cursor is in rapid motion than when it is nearly stationary. If this type of filtering is done improperly, it can produce an annoying or even unstable feedback situation.

Prior to the invention, a conventional solution was switching between two digital (software) filters having different filter constants, with the switch occurring at a particular cursor velocity. Although this may have been suitable for a head-mounted device, it is inadequate for a hand-held device, causing a jerky cursor movement.

An improved filter was developed using continuously varying filter constants. Additionally, a special algorithm is applied to undo the sudden jump in cursor position caused by "hand-twitch" when the button is pressed.

The filter operates on unfiltered cursor coordinates (Xc, Yc) which are obtained every Ts seconds, where Ts is the data sampling time. Filtered coordinates Xf and Yf, are obtained by applying a recursive low-pass filter described by the following equations:

$$Xf(t) = Xf(t - Ts) + \frac{(Xc(t) - Xf(t - Ts))}{Nx} \quad (4a)$$

$$Yf(t) = Yf(t - Ts) + \frac{(Yc(t) - Yf(t - Ts))}{Ny} \quad (4b)$$

In a conventional recursive filter, Nx and Ny would be a constant and equal to a single constant N. Such a filter would have a fixed cutoff frequency Fc and a lag time $\tau$ given by:

$$Fc = \frac{1}{(2\pi NTs)}, \text{ where } \tau = NTs \quad (5)$$

The degree of filtering increases in proportion of N. If N is made large enough to eliminate visible cursor jitter caused by hand tremors, then the cursor lag time will be excessive. Instead, the value of N is made to decrease smoothly with increasing cursor velocity (Vx, Vy). The velocity is estimated as:

$$Vx(t) = (Xc(t) - Xf(t - Ts))$$

$$Vy(t) = (Yc(t) - Yf(t - Ts))$$

A smooth and well-behaved function for Nx is as follows:

$$Nx = \frac{(A + Vx)}{(B + Vx)}, \quad (7)$$

It is evident that Nx→1 for large Vx while Nx→A/B for small Vx. The equations for Ny are identical. Substituting for the case where Nx→1, we find that Xf(t)=Xc(t) for large Vx. Thus, at high velocity, the cursor will simply follow the pointing device coordinates without filtering. During such rapid motion, jitter caused by hand tremors is not noticeable. At low velocity, the delay time and cutoff frequency become:

$$To = \left(\frac{A}{B}\right) Ts \quad (8)$$

$$Fc = \frac{1}{2\pi To} = \frac{B}{A(2\pi)Ts} \quad (9)$$

The values of A and B are adjusted empirically to obtain a good "feel", using the above relationship as a guide.

Figure 6A:
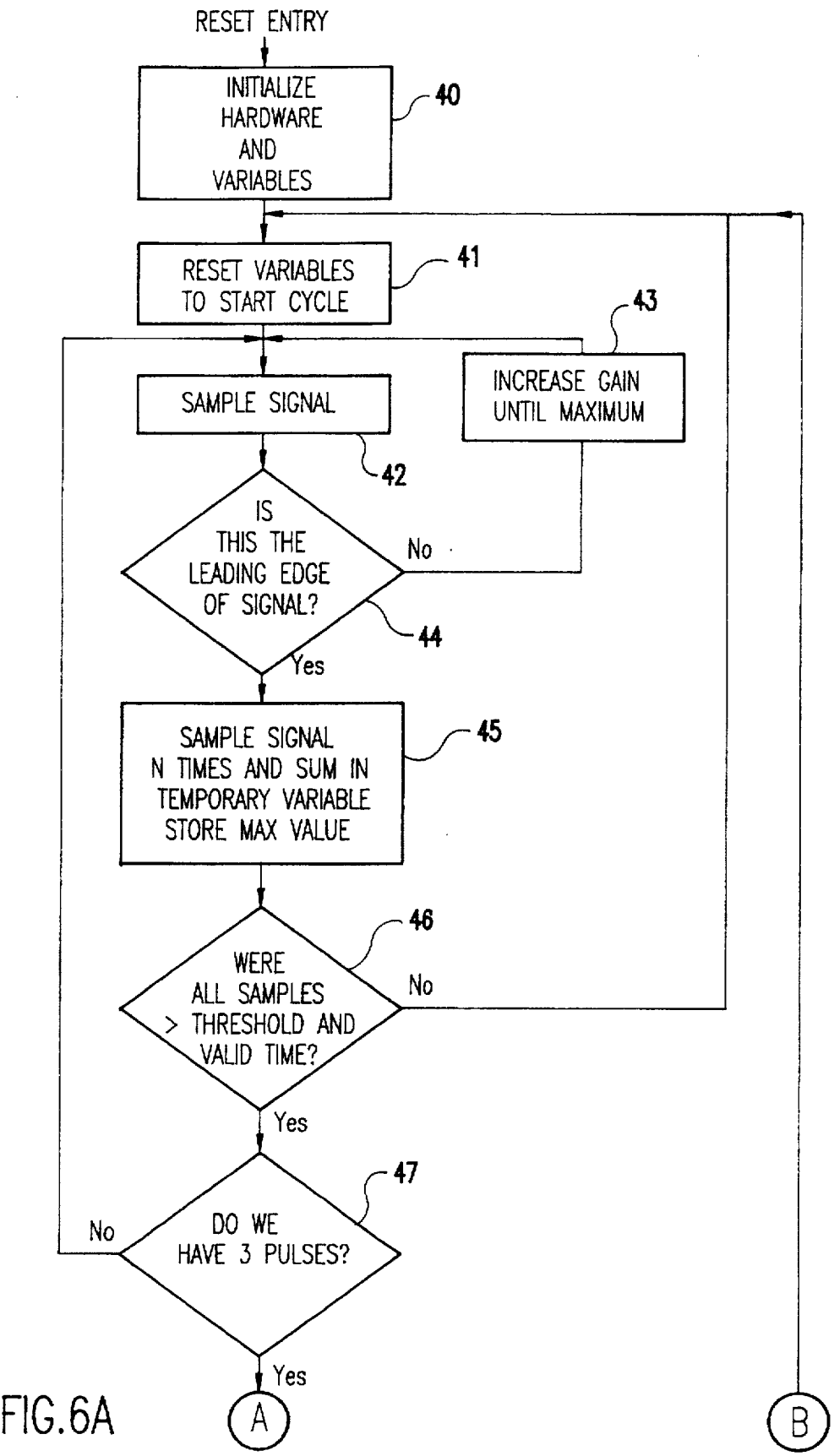
FIGS. 6A and 6B, taken together, are a flow diagram of the logic of the control program implemented by the micro controller in the receiver shown in FIG. 4.
Figure 6B:
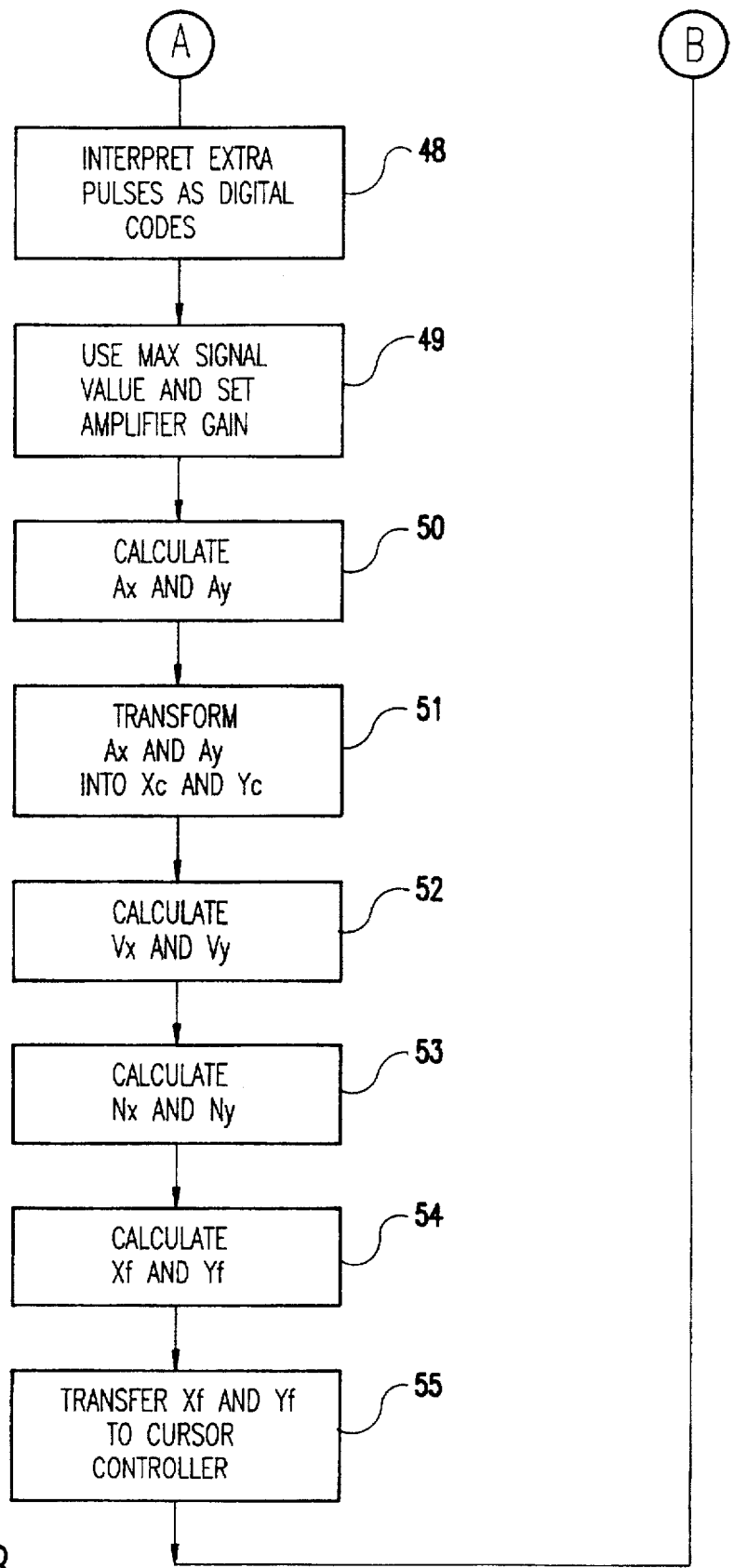

The logic of the control program of computing element 23 is further shown in the flow chart shown in FIGS. 6A and 6B.

First, in FIG. 6A, hardware and variables are initialized in function block 40.

Variables are reset in function block 41 to start a new cycle. A sample signal is then received in function block 42.

In decision block 43, a determination is made as to whether the leading edge of the signal is being received. If the leading edge is not being received, the gain is increased by opening switches 29 in function block 44, and the process again samples the signal in function block 42.

When a leading edge is detected, the signal is sampled N times in function block 45 and summed and stored. The maximum value of the first three pulses is also stored for use in block 49.

A test is next made in decision block 46 to determine if all the samples are greater than a threshold and occur at valid times. If not, the process loops back to function block 41 to reset variables and start a new cycle; otherwise, a valid pulse has been received.

Then, a test is made in decision block 47 to determine if three pulses have been received, one from each of the IRLEDs of the hand held transmitter. If not, the process loops back to function block 42 to sample the signal in order to detect the next pulse.

When three pulses have been received, the process goes to function block 48 in FIG. 6B which interprets extra pulses as digital codes. In function block 49, the maximum signal value received is used to set the amplifier gain in section 19. Now the process of calculating the pointing location begins. In function block 50, Ax and Ay are first calculated. The calculated values of Ax and Ay are then transformed into Xc and Yc in function block 51. Vx and Vy are calculated in function block 52, as $$Vx = Xc - Xf$$

$$Vy = Yc - Yf$$

Nx and NY are calculated in function block 53, as $$Nx = \frac{(A + Vx)}{(B + Vx)} \quad (11a)$$

$$Ny = \frac{(A + Vy)}{(B + Vy)} \quad (11b)$$

Xf and Yf are calculated in function block 54, as $$Xf = Xf + \frac{(Xc - Xf)}{Nx} \quad (12a)$$

$$Yf = Yf + \frac{(Yc - Yf)}{Ny} \quad (12b)$$

The new values of Xf and Yf are fed back to function block 52 to continue the calculation of Vx and Vy. At the same time, the calculated values of Xf and Yf are transferred to the cursor controller in function block 55 to move the cursor on the display. The process then loops back to function block 41 in FIG. 6A to await new pointing cursor signals.

As discussed above, the filter used to evaluate equations such as 12a and 12b, that require division, may "hangup" if the filter does not have floating point capability. However, filters having floating point are more expensive than those filters not having floating point capability. Thus, digital filters, such as recursive filters, that do not have floating point capability are less expensive and also simplify writing a device driver.

The invention uses a novel digital filter without floating point capability. However, the digital filter avoids the problem of "hangups" by using fixed point arithmetic in which the coefficients are represented by rational numbers, and the remainder of each division is added to the dividend during the next iteration.

Specifically, the remainder (Rn) is saved after each division step. The remainder may be available in a microprocessor register, or can be easily calculated. The remainder is added to the dividend in the next iteration, the division is performed, and the new remainder saved.

Figure 7:
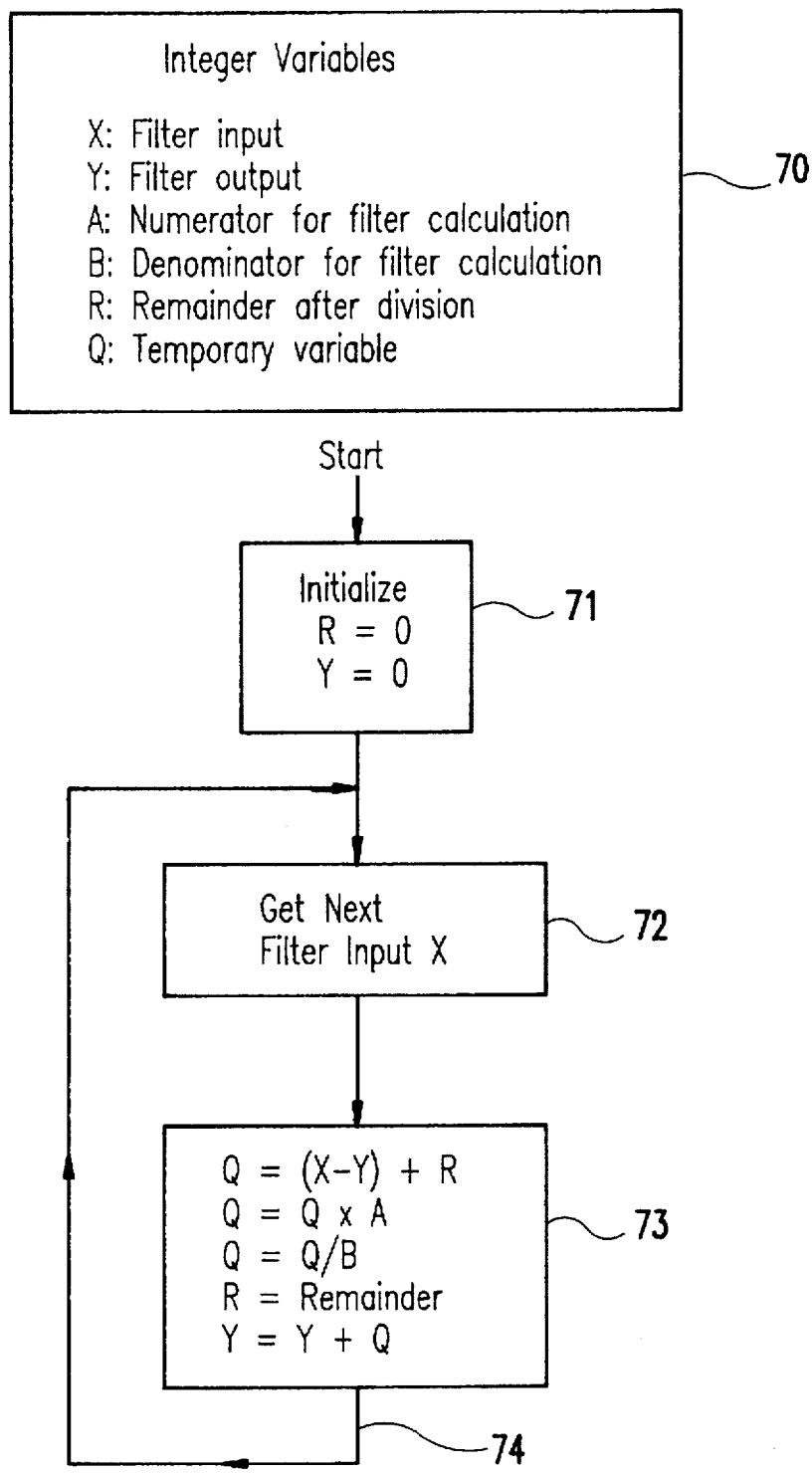
FIG. 7 illustrates a flow of processing which implements an algorithm for a digital filter according to the present invention.

More specifically, a processing flow which implements an algorithm for the digital filter according to the present invention, is shown in FIG. 7.

Assuming variables and constants are defined as shown in step 70, in step 71, the operation program begins by initializing R (remainder after division) and Y (filter output) to 0.

In step 72, a subsequent (e.g., new) filter input X is obtained and in step 73 a calculation is performed to obtain a new value of the filter output Y and a remainder R is saved for the next iteration of the operational loop.

In step 74, the program loops back to step 72 to obtain the next input value for the next iteration. These steps are performed, for example, in step 54 of FIG. 6A. An output of step 73 is input to step 55 to determine whether cursor movement is to be performed.

More specifically, the incremental value of the filter output is determined. Thus, when the remainder is less than a predetermined value (e.g., the next integer value), no cursor movement is performed. However, the remainder is accumulated such that if/when, at the end of a loop, the next integer value is achieved, then cursor movement is performed. With such an arrangement, fixed point arithmetic can be used for the digital filter instead of floating point arithmetic, thereby decreasing the cost of the system and increasing its versatility.

It is noted that the above processing is conducted simultaneously for both X and Y variables in steps 51–54 of FIG. 6B.

Using the example discussed with the "hangup" problem in the Background section as a continuing example, the benefit of such a system can be easily seen. The formula is changed by the insertion of $R_{n-1}$ to be:

$$Y_n = Y_{n-1} + (Y_n - Y_{n-1} + R_{n-1})/Q$$

The following spreadsheet shows how the inventive structure and method cures the problem of "hangups." A new column VII lists the remainder from the division in column V.

TABLE 2

| I<br>n | II<br>$X_n$ | III<br>$Y_{n-1}$ | IV<br>$X_n - Y_{n-1}$ | V<br>$(X_n - Y_{n-1})/5$ | VI<br>$Y_n$ | VII<br>$R_n$ |
|---|---|---|---|---|---|---|
| 1 | 7 | 0 | 7 | 1 | 1 | 2 |
| 2 | 7 | 1 | 8 | 1 | 2 | 3 |
| 3 | 7 | 2 | 8 | 1 | 3 | 3 |
| 4 | 7 | 3 | 7 | 1 | 4 | 2 |
| 5 | 7 | 4 | 5 | 1 | 5 | 0 |
| 6 | 7 | 5 | 2 | 0 | 5 | 2 |
| 7 | 7 | 5 | 4 | 0 | 5 | 4 |
| 8 | 7 | 5 | 6 | 1 | 6 | 1 |
| 9 | 7 | 6 | 2 | 0 | 6 | 2 |
| 10 | 7 | 6 | 3 | 0 | 6 | 3 |
| 11 | 7 | 6 | 4 | 0 | 6 | 4 |
| 12 | 7 | 6 | 5 | 1 | 7 | 0 |
| 13 | 7 | 7 | 0 | 0 | 7 | 0 |
| 14 | 7 | 7 | 0 | 0 | 7 | 0 |
| 15 | 7 | 7 | 0 | 0 | 7 | 0 |

As shown in the above example, the output reaches the input value at step 13. Such equality results because the remainder increases until it is large enough to give a non-zero growth after division (see, for example, steps 8 and 12 of Table 2 above).

More generally, a rational number can be used as a time constant as follows:

$$Y_n = Y_{n-1} + ((X_n - Y_{n-1} + R_{n-1})*A)/B$$

Where Q=B/A

The term $(X_n - Y_{n-1} + R_{n-1})$ is calculated, multiplied by A, and the result divided by B. Other types of recursive filters can be implemented in this way, although the multipliers, divisors, and input values are restricted to numbers which will not cause overflow during the multiplications. The problem of overflow can be minimized by careful choice of order of operations and size of numbers.

The above elimination of the problems of "hangups" is especially useful with the wireless pointing device for cursor control because it allows fixed point arithmetic to be used for a digital filter instead of floating point arithmetic. For such a pointing device, a digital filter, running in real time to reduce the effects of hand tremor on cursor position, is extremely advantageous. Without such a filter, the cursor jitter would be unacceptable.

Figure 8:
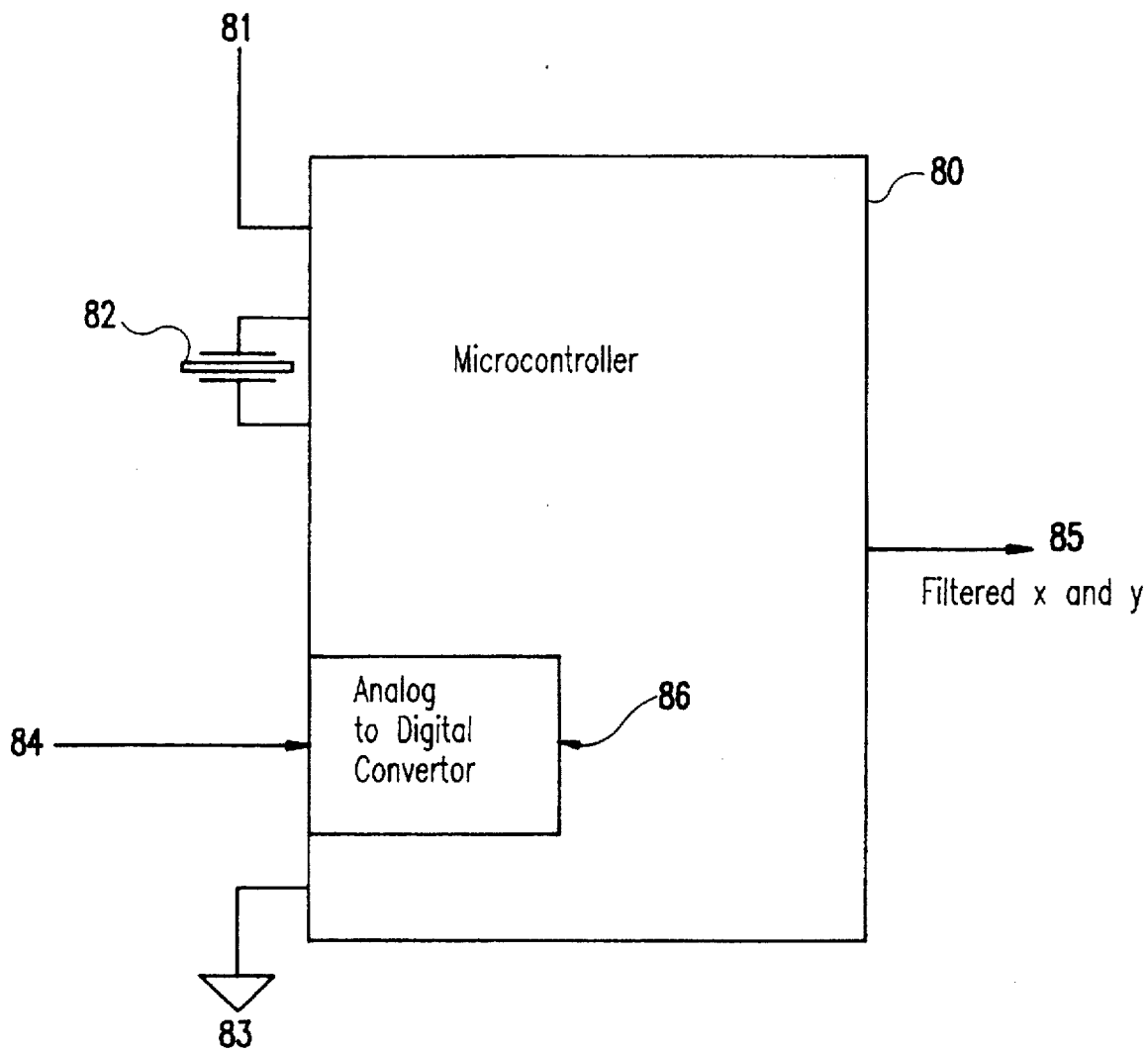
FIG. 8 illustrates an exemplary microprocessor/microcontroller in which is implemented the digital filter according to the present invention that has a fixed point arithmetic function.

FIG. 8 illustrates an exemplary microprocessor/microcontroller in which is implemented a digital filter according to the present invention that has a fixed point arithmetic function. Microcontroller 80 uses a voltage source 81, a crystal 82, a ground 83, an analog-to-digital convertor (ADC) 86, input 84 to the ADC, and output 85 containing the filtered x and y values.

Analog data is input to the ADC 86 and the data is converted to digital form. The data is processed by the program implemented in the microprocessor, as described above with respect to FIGS. 6A, 6B and 7. Filtered digital data is then output from the output 85.

For an example of the complete non-linear filter algorithm, assume a previous filtered y value of 200 followed by a jump to a new location of 300, and then several points close to 305. Applying the above to equations 4A through 12B would result in the following results for the values and therefore of the filter output. Note that the first jump is large, so filtering is not done on the first step and the remainder is cleared. The values d1=90, d2=104 and d3=6 are used. After the first jump, the filter output gradually converges to the value 305.

| n | yf | rem | y | vel | avel | d2 + avel | d3 + aveL | tau |
|---|---|---|---|---|---|---|---|---|
| 1 | 200 | 7 | 300 | 100 | 100 | — | — | — |
| 2 | 300 | 0 | 305 | 5 | 5 | 109 | 11 | 9 |
| 3 | 300 | 4 | 306 | 6 | 6 | 110 | 12 | 9 |
| 4 | 301 | 1 | 304 | 3 | 3 | 107 | 9 | 11 |
| 5 | 301 | 7 | 304 | 3 | 3 | 107 | 9 | 11 |
| 6 | 301 | 10 | 305 | 3 | 3 | 107 | 10 | 10 |
| 7 | 302 | 4 |  |  |  |  |  |  |

An example of application of the foregoing to a computer program is described below with pseudocode (similar to Pascal or C languages).

The operator "div" implies integer division. The operator "mod" returns the remainder after division. The example given is for the "y" value. The same code can be used for the "x" value.

The filter parameter tau is computed as follows. First, the velocity is calculated as yf−y and saved as "vel" for later use. Next, the magnitude (absolute value) of the velocity is calculated and saved as "avel." If this is larger than a constant d1, the filter is not used. Instead the filter output is simply set equal to the input. If the magnitude of the velocity is less than d1, the parameter tau is calculated as tau=(d2+avel)/(d3+avel). The values d2 and d3 determine both the degree of filtering at very low velocities, as well as the velocity at which the filtering changes from small to large.

When filtering is done, the formula is yf=fy+(rem+yf−y)/tau. The remainder from each division by tau is saved and used for the next calculation of yf.

| constants | |
|---|---|
| d1 = 90; | !These three constants control the |
| d2 = 104; | !properties of the non-linear filter parameter |
| d3 = 6; | !tau. Tau approaches d2/d3 for small velocities. |
| | !If the velocity is greater than d1, the filter |
| | !is not used. |
| variables | |
| y:integer; | !This is the latest unfiltered y value. |
| yf:integer; | !This will be the next filtered y value. |
| tau:integer; | !This is the filter parameter. |
| rem:integer; | !This is the remainder after division by tau. |
| vel:integer; | !The velocity. |
| avel:integer; | !The magnitude of the velocity. |
| Procedure filter; | !Filter subroutine. |
| begin | |
| vel = y − yf | !Compute the velocity |

-continued

```
avel = abs(vel)                              !and the absolute value.
                                             Now compute tau, tau =
if(avel > d1) then                           !(d2 + abs(vel)/d3 + abs(vel)).
  begin                                      !Check magnitude of velocity
    yf = y;                                  !for large velocity, don't filter
    rem = 0;                                 !just set output equal to input
  end                                        !and set remainder.
else
  begin                                      !For small velocity, use filter.
    tau = (avel + d2)div(avel + d3)          !First compute filter
parameter
    yf = yf + (vel + rem)div tau             !compute filtered output
    rem = mod(vel + rem)/tau;                !save remainder.
  end;
end; (end of subroutine)
```

A problem common to "point and shoot" devices is the act of pressing the trigger or button spoils the aim. For some people, anticipatory and largely involuntary tremors may exaggerate the effect. A solution to this problem is based on the idea that the cursor position will have stabilized a short time prior to the button press. Using a circular buffer stack in computer memory in function block 45, a short list of prior cursor positions is maintained. After each button press, an algorithm is applied to the list to locate this stable point. The preferred embodiment of this invention makes use of that technique, described in U.S. Pat. No. 4,558,313, which is incorporated herein by reference.

Several variations of this invention can be created. Thus, while the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A remote pointing system for controlling a cursor location on a display device comprising:
   a pointing device for controlling said cursor location on said display device by transmitting a plurality of signals, each of said signals being aimed off a pointing axis of the pointing device in different directions;
   a receiver for receiving said signals from said pointing device:
   a digital processor for processing said signals as data representing a of aim on said display device by said pointing device, said digital processor controlling said cursor location on the display device, said digital processor comprising a recursive filter including means for using fixed point arithmetic, said recursive filter including means for saving a remainder after each division and for adding said remainder to a dividend in a subsequent division operation.

2. A remote pointing system as in claim 1, wherein said plurality of signals includes at least three signals.

3. A remote pointing system as in claim 1, wherein said pointing device includes a plurality of infrared light emitting diodes for generating said plurality of signals.

4. A remote pointing system as in claim 1, wherein said pointing device includes a plurality of signal generating means, each of said signal generating means including a circuit for sequentially pulsing said signals with pulse trains for causing said signal generating means to individually and sequentially emit modulated signals.

5. A remote pointing system as in claim 1, wherein said receiver comprises an infrared detector and amplifier tuned to a predetermined pulse frequency.

6. A remote pointing system as in claim 1, wherein said receiver includes a demodulator for converting said signals to analog base-band pulses.

7. A remote pointing system as in claim 6, wherein said receiver includes an analog-to-digital converter for digitizing said analog base-band pulses.

8. A remote pointing system as in claim 1, further comprising a cursor controller responsive to said digital processor for controlling said cursor location on said display device.

9. A remote pointing system for controlling a cursor location on a display device comprising:
   a pointing device for remotely controlling the cursor on the display device, said pointing device comprising:
      at least three infrared light emitting diodes (IRLEDs), each of said IRLEDs aimed off a main or pointing axis of the pointing device in different directions; and
      a circuit connected to each of said IRLEDs responsive to a user input for sequentially pulsing said IRLEDs with pulse trains so as to cause the IRLEDs to individually and sequentially emit modulated infrared light signals;
   a receiver and controller located proximate to said display device, said receiver and controller comprising:
      an infrared detector and amplifier tuned to a predetermined pulse frequency;
      a demodulator to convert received signals to analog base-band pulses;
      an analog-to-digital convertor to digitize the analog base-band pulses;
      a digital processor to process the digitized analog base-band pulses as data representing a point of aim on the display device by the pointing device, said digital processor controlling the position of a cursor on the display device; and
      a cursor controller responsive to said digital processor for controlling a cursor position on the display device,
   wherein said digital processor includes a recursive filter using fixed point arithmetic for performing division, said recursive filter saving the remainder after each division operation and adding said remainder to the dividend in the following division operation.

10. A method of controlling a cursor location on a display device using a pointing device comprising steps of:
    transmitting a plurality of signals from said pointing device to a receiver, said signals being aimed in different directions;
    receiving said signals with said receiver;
    processing said signals with a filter as data representing a point of aim on said display device by the pointing device; and
    ensuring output values follow changes in input values for said filter comprising steps of using fixed point arithmetic for performing division of said input values and saving the remainder after each said division and adding said remainder to the dividend in the subsequent division.

11. A method as in claim 10, wherein said transmitting step includes a step of transmitting at least three signals in different directions.

12. A method as in claim 10, wherein said transmitting step includes a step of transmitting infrared light signals.

13. A method as in claim 10, wherein said transmitting step includes a step of sequentially pulsing said signals with pulse trains so as to cause said signals to individually and sequentially emit modulated signals.

14. A method as in claim 10, wherein said receiving step includes a step of amplifying said signals to a predetermined pulse frequency.

15. A method as in claim 10, wherein said receiving step includes a step of converting said signals to analog base-band pulses.

16. A method as in claim 15, wherein said receiving step includes a step of digitizing said analog base-band pulses.

17. A method as in claim 10, further comprising a step of controlling said cursor location based on said processing step.

* * * * *